(12) United States Patent
Olkkonen et al.

(10) Patent No.: US 9,688,511 B2
(45) Date of Patent: Jun. 27, 2017

(54) BRAKE

(71) Applicant: KONE Corporation, Helsinki (FI)

(72) Inventors: Mika Olkkonen, Hyvinkää (FI); Petri Alkula, Hämeenlinna (FI); Raimo Pelto-Huikko, Vantaa (FI)

(73) Assignee: KONE CORPORATION, Helsinki (FI)

( * ) Notice: Subject to any disclaimer, the term of this patent is extended or adjusted under 35 U.S.C. 154(b) by 269 days.

(21) Appl. No.: 14/605,473

(22) Filed: Jan. 26, 2015

(65) Prior Publication Data

US 2015/0129365 A1 May 14, 2015

Related U.S. Application Data

(63) Continuation of application No. PCT/FI2012/050860, filed on Sep. 5, 2012.

(30) Foreign Application Priority Data

Aug. 24, 2012 (FI) ...................................... 20125875

(51) Int. Cl.
*B66B 5/02* (2006.01)
*B60T 1/04* (2006.01)
*F16D 59/02* (2006.01)
*F16D 65/00* (2006.01)
*F16D 65/06* (2006.01)
*B66B 1/32* (2006.01)
(Continued)

(52) U.S. Cl.
CPC .................. *B66B 5/02* (2013.01); *B60T 1/04* (2013.01); *B61H 1/00* (2013.01); *B66B 1/32* (2013.01); *B66D 5/08* (2013.01); *B66D 5/30* (2013.01); *F16D 59/02* (2013.01); *F16D 65/0006* (2013.01); *F16D 65/06* (2013.01); *F16D 2121/26* (2013.01); *F16D 2125/26* (2013.01); *F16D 2125/645* (2013.01); *F16D 2127/008* (2013.01); *H02P 15/00* (2013.01)

(58) Field of Classification Search
CPC .... B66B 5/02; B66B 1/32; B60T 1/04; B61H 1/00; B66D 5/08; B66D 5/30; F16D 59/02; F16D 65/0006; F16D 65/06
See application file for complete search history.

(56) References Cited

U.S. PATENT DOCUMENTS 1,455,895 A * 5/1923 Thurston ................. B60T 13/74
188/106 R
2,065,259 A * 12/1936 Ball ........................ F16D 49/16
188/105
(Continued)

*Primary Examiner* — Michael Riegelman
(74) *Attorney, Agent, or Firm* — Birch, Stewart, Kolasch & Birch, LLP

(57) ABSTRACT

The invention relates to a brake and to a method for controlling the brake. The brake comprises a base part, a braking piece movably supported on the base part, which braking piece is configured to be moved between a braking position and a releasing position, a spring, with the spring force of which the braking piece can be dropped into a braking position, a support member for limiting the initial position of the drop-out movement of the braking piece and also a controllable actuator, which is mechanically connected to the aforementioned support member and configured to displace the initial position of the drop-out movement of the braking piece with respect to the braking position.

18 Claims, 2 Drawing Sheets

(51) Int. Cl.
- B66D 5/08 (2006.01)
- B66D 5/30 (2006.01)
- B61H 1/00 (2006.01)
- *F16D 121/26* (2012.01)
- *F16D 125/26* (2012.01)
- *F16D 125/64* (2012.01)
- *F16D 127/00* (2012.01)
- *H02P 15/00* (2006.01)

(56) References Cited

U.S. PATENT DOCUMENTS

| | | | | |
|---|---|---|---|---|
| 2,422,370 A * | 6/1947 | Schnell | F16D 49/16 188/151 R | |
| 3,219,155 A | 11/1965 | Kohli | | |
| 3,373,620 A * | 3/1968 | Jordan | F16D 49/16 188/171 | |
| 3,698,520 A | 10/1972 | McClure | | |
| 4,033,434 A * | 7/1977 | Henrich | F16D 49/16 188/171 | |
| 4,132,292 A | 1/1979 | Dufresne | | |
| 4,326,609 A * | 4/1982 | Sala | F16D 49/16 188/196 BA | |
| 4,402,388 A * | 9/1983 | Wosegien | B61H 1/00 188/202 | |
| 4,875,558 A * | 10/1989 | Berkhan | B66D 5/08 188/171 | |
| 5,090,522 A * | 2/1992 | Korff | E05F 5/00 188/166 | |
| 5,153,389 A * | 10/1992 | Nomura | B66D 5/08 187/288 | |
| 5,873,434 A * | 2/1999 | Sugita | F16D 55/2245 187/288 | |
| 6,021,872 A * | 2/2000 | Sevilleja | B66B 5/027 187/266 | |
| 6,478,124 B2 * | 11/2002 | Cholinski | B66D 5/08 188/1.11 E | |
| 8,016,081 B2 * | 9/2011 | Weinberger | B66D 5/08 187/393 | |
| 8,757,330 B2 * | 6/2014 | Sato | B61H 5/00 188/106 F | |
| 2011/0198167 A1* | 8/2011 | Huppunen | B60T 8/885 188/171 | |
| 2012/0234632 A1* | 9/2012 | Ogawa | B66D 5/30 187/350 | |
| 2013/0248298 A1* | 9/2013 | Osmanbasic | B66B 5/20 187/359 | |
| 2014/0076675 A1* | 3/2014 | Olkkonen | B66D 5/30 188/205 A | |
| 2014/0291075 A1* | 10/2014 | Vlasov | B66B 5/00 187/254 | |
| 2014/0332238 A1* | 11/2014 | Zhang | B66D 5/08 166/385 | |

\* cited by examiner

BRAKE

CROSS REFERENCE TO RELATED APPLICATIONS

This is a continuation of the International Application No. PCT/FI2012/050860 filed on Sep. 5, 2012, and claims priority from Finland Patent Application No. 20125875 filed on Aug. 24, 2012, the entire disclosures of which are hereby incorporated herein by reference.

FIELD OF THE INVENTION

The invention relates to brakes and more particularly to the control mechanisms of brakes to be used as safety devices.

BACKGROUND OF THE INVENTION

In an elevator hoisting machine, for example, a machinery brake that mechanically engages with a rotating part of the hoisting machine is normally used as a brake device. Structurally, the machinery brake can be e.g. a shoe brake, a drum brake or a disc brake.

The machinery brake generally comprises springs, which push a braking piece provided with a brake pad against the braking surface of a rotating part to brake the movement of the rotating part of the hoisting machine. A machinery brake generally also comprises an electromagnet, with which a braking piece provided with a magnetic core is pulled against the thrusting force of the springs into a releasing position of the brake away from the braking surface. The machinery brake is dropped by disconnecting the current supply of the electromagnet of the machinery brake, in which case the force of attraction of the electromagnet ceases and the springs in the brake push the braking piece provided with a brake pad from the initial position of the drop-out movement into the braking position against the braking surface of the rotating part.

During a run, current is connected to the electromagnet, in which case the braking piece is in the releasing position and the elevator car can move up or down in the elevator hoistway.

As the current of the electromagnet decreases, the thrusting force exerted by the spring finally exceeds the force of attraction of the electromagnet, and the braking piece displaces into the braking position. Owing to the imbalance of forces the brake pad strikes against the braking surface of the rotating part of the machine. When the brake opens, the electromagnet again exerts on the braking piece a force that is in the opposite direction to the thrusting force of the spring. When the force exerted on the braking piece by the electromagnet increases to be greater than the spring force, the air gap between the base part of the brake and the braking piece closes, and the armature part strikes against the base part.

AIM OF THE INVENTION

Collision of the parts of a brake against each other when the brake is activated or opened might cause a disturbing noise. The noise problem can be remedied by adding e.g. a separate damper to the air gap between the base part and the braking piece, which damper when the brake is open prevents direct contact between the countersurfaces of the base part and of the braking piece. A damper can be made of an elastic material, such as rubber or polyurethane; a damper can also be implemented with a separate spring dimensioned for this purpose, such as with a helical spring or cup spring.

There are drawbacks related to the use of the damper of a brake described above. In particular the service life of a damper made from rubber or polyurethane is rather short and strongly depends on the operating temperature. For preventing heating, the excitation winding of the electromagnet of the brake must often be overdimensioned.

A damper can be disposed in the air gap between the base part and the braking piece, in which case the reluctance of the magnetic circuit of the brake increases and the current requirement of the electromagnet at the same time increases. On the other hand, increasing attention is being paid to the energy consumption of elevators, so that it should also be possible to reduce the energy consumption of the electromagnet of a brake.

The aim of the invention is therefore to disclose an improved structure of a brake, which structure is particularly suited for use as a mechanical safety device of an elevator. The aim of the invention is to solve in particular the noise problems of a brake. One aim of the invention is to reduce the energy consumption of a brake. One aim of the invention is to solve the problems related to heating of brake. One aim of the invention is to disclose a brake, with which the braking force can be adjusted and changed more precisely than in prior art. One aim of the invention is to disclose a brake in the control mechanism of which the necessary power production is achieved with smaller components than in prior art.

To achieve these aims the invention discloses a brake according to claim 1, an elevator system according to claim 9, a method according to claim 12, and also a method according to claim 14. The preferred embodiments of the invention are described in the dependent claims. Some inventive embodiments and inventive combinations of the various embodiments are also presented in the descriptive section and in the drawings of the present application.

SUMMARY OF THE INVENTION

The brake according to the invention comprises a base part, a braking piece movably supported on the base part, which braking piece is configured to be moved between a braking position and a releasing position, a spring, with the spring force of which the braking piece can be dropped from the initial position of the drop-out movement into a braking position, a movable support member for limiting the initial position of the drop-out movement of the braking piece, and also a controllable actuator, which is mechanically connected to the aforementioned support member and configured to displace the initial position of the drop-out movement of the braking piece with respect to the braking position. The aforementioned spring can also be comprised of a number of springs, e.g. of a number of cup springs connected to each other. Braking position means a position in which a braking piece being disposed in which presses against the part to be braked, braking its movement and/or preventing the starting of the part to be braked. Correspondingly, a braking piece being disposed in the releasing position does not brake the aforementioned part to be braked and/or prevent the starting of the part to be braked. The initial position of the drop-out movement means the position in which the braking piece is situated at the beginning of the drop-out movement, before the drop-out movement of the brake has occurred.

According to the invention the braking function can be soundlessly activated by displacing the initial position of the drop-out movement/the braking piece in the initial position of the drop-out movement from the releasing position into the braking position in a controlled manner with a predetermined movement profile implemented by the actuator, with which profile the striking of the surfaces of the brake against each other, and the disturbing noise produced by this, is prevented. Likewise, the brake can be soundlessly released by displacing the initial position of the drop-out movement/the braking piece in the initial position of the drop-out movement from the braking position into the releasing position in a controlled manner with a predetermined movement profile implemented by the actuator.

At the same time safe operation of the brake is ensured with the drop-out apparatus, which drops the braking piece to displace from the initial position of the drop-out movement into the braking position when a triggering means is controlled immediately an operational anomaly/possible dangerous situation is detected. Consequently, the brake of an elevator according to the invention can, during normal operation of the elevator, be controlled soundlessly with the actuator and when an operational anomaly of the elevator is detected the brake can be dropped, in which case the braking piece displaces into the braking position and braking starts as quickly as possible when the braking piece strikes the braking surface from the effect of spring force. The disturbing noise produced by release of the braking piece can be accepted in an operational anomaly of the elevator, because it is more important than the noise nuisance in this case to provide for the safety of the elevator and for the braking to start as quickly and reliably as possible. Owing to the safe and reliable operation described above, the brake according to the invention is also suited for use as a mechanical safety device of an elevator.

The second aspect of the invention relates to an elevator system, to which a brake according to the invention is fitted.

The invention also relates to a method for controlling a brake according to the invention. In the method the operating mode of the elevator is determined, and also the brake is controlled during normal operation of the elevator by displacing the initial position of the drop-out movement of the braking piece with the actuator.

Deceleration during an emergency stop of the elevator car can also be adjusted with the brake according to the invention by changing the braking force with the actuator. Consequently, the invention enables a solution wherein a movement profile, most preferably a speed profile, is formed, according to which movement of the elevator car can be stopped safely in connection with an emergency stop of the elevator and also the elevator car is stopped by changing the movement of the elevator car towards the aforementioned movement profile by adjusting the braking force with the actuator. The solution enables the stopping of the movement of an elevator car in a controlled manner and with a sufficiently low deceleration, in which case dangerously large deceleration forces are not exerted on the passengers in the elevator car in connection with an emergency stop. In one preferred embodiment of the invention the aforementioned movement profile is formed to decelerate the speed of the elevator car from the starting point of deceleration to zero when the elevator car arrives at an oncoming stopping floor. In this case the elevator passengers can transfer quickly to the stopping floor and they are also able to exit the elevator quickly despite the operationally exceptional situation of the elevator. It is necessary to perform an emergency stop of the elevator if during a run with the elevator a type of operational anomaly occurs that, for safety or other reasons, prevents continuation of the run. This type of operational anomaly can be e.g. a power outage or the opening into the elevator hoistway of an entrance of the elevator hoistway.

The brake according to the invention is preferably a machinery brake of a hoisting machine of an elevator or a car brake moving along with the elevator car, and engaging in a prong-like manner with the braking surface on a guide rail of the elevator car and/or counterweight, and braking against the braking surface.

The brake according to the invention can also be used as a machinery brake of the drive machinery of an escalator or of a travelator. In addition, the prong-type car brake according to the invention can be applied as a brake of an escalator or travelator by configuring the brake prong to grip into attachment with the path of movement of the escalator/travelator.

The preceding summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1A:
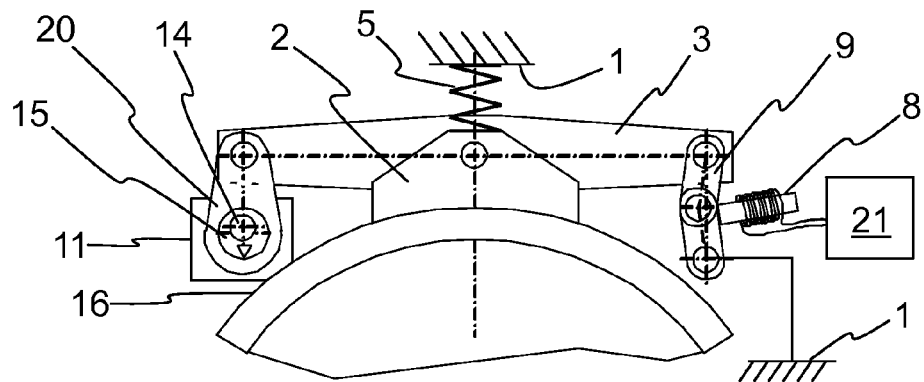
FIGS. 1a-1c present a shoe brake, according to an embodiment of the invention, of a hoisting machine of an elevator.
Figure 1B:
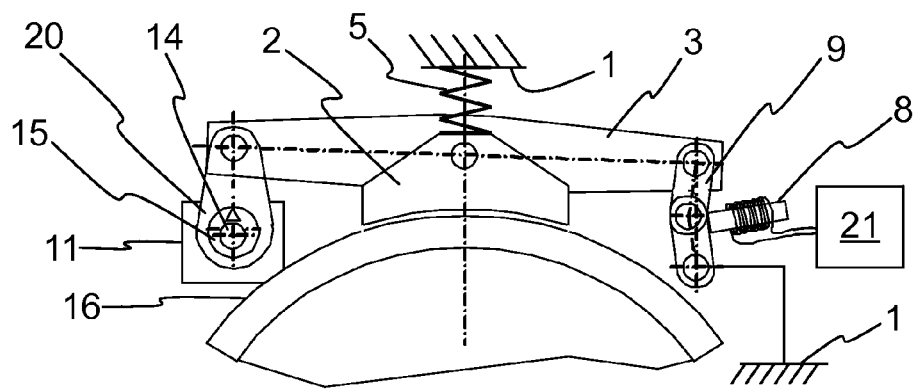
Figure 1C:
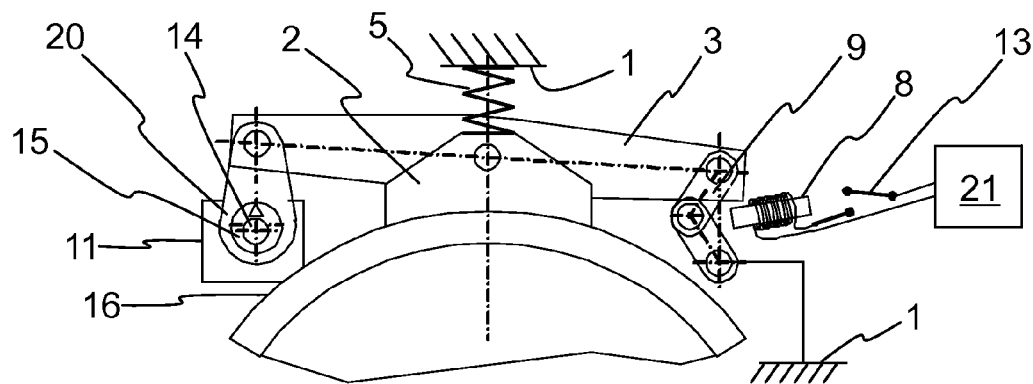

FIGS. 1a-1c present a shoe brake of a hoisting machine of an elevator in different operating situations such that FIG. 1a presents a situation in which the brake is activated to brake the hoisting machine of the elevator in connection with normal operation of the elevator, FIG. 1b presents a situation in which the brake is released in connection with normal operation of the elevator, and FIG. 1c presents a situation in which the brake is dropped and the drop-out movement of the brake has occurred as a consequence of a operational anomaly of the elevator.

The brake control mechanism according to FIGS. 1a-1c can also be fitted to a disc brake, instead of a shoe brake, e.g. such that one of the braking pieces on opposite sides of the brake disc is configured to be controlled with a control mechanism according to FIGS. 1a-1c.

The hoisting machine of an elevator means a drive device with which an elevator car is driven in a vertical direction in an elevator hoistway on the basis of elevator calls given by elevator passengers. The driving force needed for driving the elevator car is transmitted via a rope transmission or belt transmission between the elevator car and the rotating traction sheave of the hoisting machine, as is generally known in the art.

The shoe brake of FIGS. 1a-1c comprises a base part 1, which is attached to the frame of the hoisting machine. In addition, the brake comprises a brake shoe 2 movably supported on the base part. The brake comprises a spring 5, which brings about a thrusting force between the base part 1 and the brake shoe 2, which thrusting force presses the brake pad comprised in the brake shoe 2 into contact with the braking surface 16. The brake also comprises a hinged counterforce element 9 resisting the thrusting force of the spring 5, which element engages via a lever arm 3 with the brake shoe 2. An electromagnet 8, which receives its electricity supply from a power source 21, is fitted in connection with the counterforce element 9. The electromagnet 8 attached to the base part 1 exerts a force of attraction on the hinge point of the counterforce element 9, which force prevents buckling of the counterforce element 9.

The brake is controlled during normal operation of the elevator with the electric motor 11. The rotating shaft 14 of the electric motor 11 is connected to an eccentric adjustment means 15, which is connected via bearings to a support piece 20, which is further connected with a hinged joint to the lever arm 3 and via the lever arm 3 to the brake shoe 2 such that the brake shoe 2 moves between the releasing position according to FIG. 1b and the braking position according to FIG. 1a when the rotating shaft 14 is rotated with the electric motor 11. The brake is activated by displacing the brake shoe 2 from the releasing position according to FIG. 1b into the braking position according to FIG. 1a, in which position the brake pad on the brake shoe is pressed against the braking surface 16 of a rotating part of the hoisting machine to brake the movement of the traction sheave of the hoisting machine/movement of the elevator car. Correspondingly, the brake is opened by displacing the brake shoe 2 from the braking position according to FIG. 1a into the releasing position according to FIG. 1b. The electric motor is controlled such that in the movement profile of the brake shoe 2 the speed of the brake shoe 2 just before colliding with the braking surface is so small that no noise from the collision that might disturb elevator passengers or other users of the building is produced. A requirement for control of the brake with an electric motor is that buckling of the counterforce element 9 is prevented. The electric motor can be a direct-current motor or an alternating-current motor. In some embodiments the electric motor 11 is a brushless direct-current motor having a rotor with magnetized permanent magnet, and which motor 11 is controlled with a frequency converter implementing a movement profile predetermined for the brake shoe 2. In some embodiments an alternating-current motor 11 can be connected directly to the supplying alternating-current network with a suitable switch, such as with a relay or contactor, and the brake shoe 2 is moved with the alternating-current motor 11 by connecting the phases of the alternating-current motor 11 to the phases of the alternating-current network by controlling the aforementioned switch.

In an operational anomaly of the elevator the brake is dropped by disconnecting the current supply of the electromagnet 8 with a switch 13 functioning as a triggering means. When the current supply is disconnected, the counterforce element 9 buckles and the force effect resisting the thrusting force of the spring 5 of the counterforce element 9 ceases, in which case the brake shoe 2 displaces from the effect of the spring force at the greatest possible speed from the initial position of the drop-out movement limited by the eccentric adjustment means 15, the support piece 20, the lever arm 3 and the counterforce element 9 into the position according to FIG. 1c, pressing against the braking surface 16 to brake the movement of the hoisting machine. Consequently, the situation according to FIG. 1c is always ended up in from the initial position of the drop-out movement according to FIG. 1a or 1b when the brake is dropped. It should be noted that also in FIG. 1a the brake shoe is in the braking position engaged against the braking surface 16 of the hoisting machine; the situation according to FIG. 1c, however, differs from the situation of FIG. 1a in that, unlike in the situation in FIG. 1a in which the brake is not dropped and the brake shoe 2 is therefore still in the initial position of the drop-out movement, in the situation of FIG. 1c the brake is dropped and the brake can in this case no longer be opened again with the electric motor 11. Controlling the brake with the electric motor 11 is possible only when the brake shoe is in the initial position of the drop-out movement. Consequently, re-opening the dropped brake with the electric motor 11 requires that the eccentric adjustment means 15 is turned into the position according to FIG. 1a and that current is connected to the electromagnet 8. The current supply to the electromagnet 8 is connected in the situation of FIG. 1a because in this case the counterforce element 9 has straightened such that the hinge point of the counterforce element 9 is situated near the electromagnet 8 and the current requirement of the electromagnet is smaller. When the current of the electromagnet 8 is connected, the ability of the counterforce element 9 to resist the spring force returns and the brake shoe displaces to the initial position of the drop-out movement. For the reasons described above, the situation of FIG. 1c is therefore also fail-safe such that a malfunction of the electric motor or of a control device of the electric motor cannot result in erroneous opening of the brake.

The brake is dropped in an operational anomaly of the elevator, when the safety of the elevator requires rapid activation of the brake using spring force. This type of operational anomaly can be e.g. an emergency stop of the elevator, a stopping of the elevator with service drive, a stopping of the elevator with rescue drive, a stopping of the elevator owing to an electricity outage, and also in connection with precision leveling of the elevator car. An operational anomaly is normally detected as an opening of a safety switch in the safety circuit of the elevator.

The transmission of the electric motor 11 can be selected such that the shaft of the electric motor rotates a number of revolutions when the eccentric adjustment means 15 turns 180 degrees opening or closing the brake. In this case the torque requirement of the electric motor is smaller and the size of the electric motor 11 can be reduced. The force of attraction needed of the electromagnet 8 for preventing buckling of the counterforce element 9 is rather small, for which reason also the electromagnet 8 can be of a small size in its dimensioning. This is useful e.g. in those elevator systems in which, to increase safety, two machinery brakes according to the embodiment of FIGS. 1a-1c are fitted to the same hoisting machine.

The energy consumption of the brake can be reduced during a standstill of the elevator by dropping the brake by disconnecting the current supply of the electromagnet 8 after the brake has first been activated with the electric motor 11. In this case the next time the brake is opened by turning the eccentric adjustment means 15 into the position according to FIG. 1a and current is supplied to the electromagnet 8, thereby switching to the initial position of the drop-out movement. After this, the situation switches from the situation in FIG. 1a to the situation in FIG. 1b by opening the brake with the electric motor 11.

Figure 2:
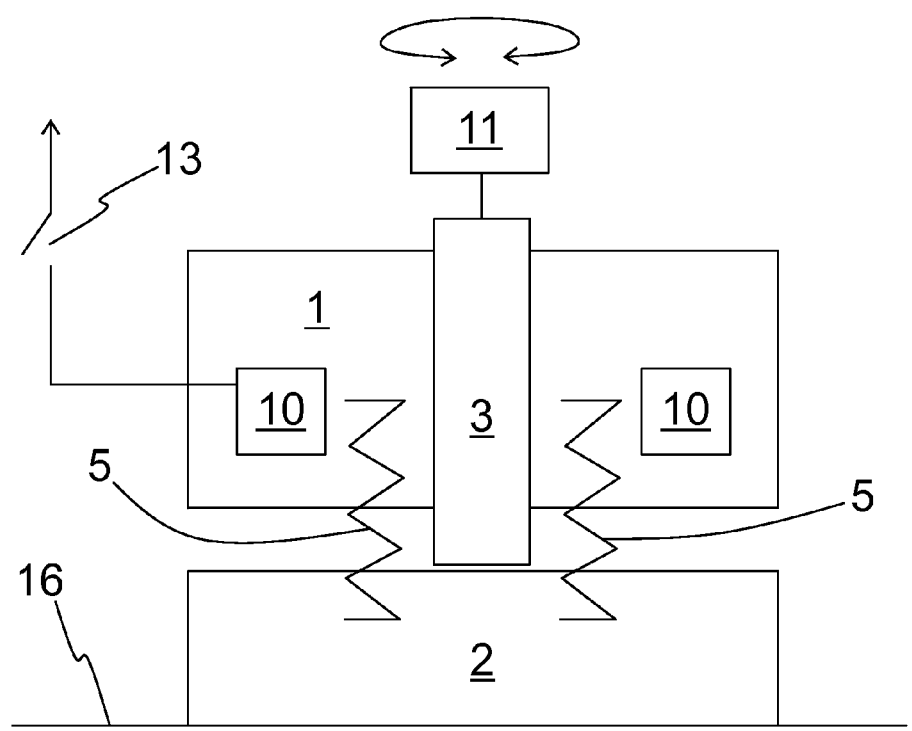
FIG. 2 presents a brake, according to an embodiment of the invention, of a hoisting machine of an elevator.

FIG. 2 diagrammatically presents a brake, according to an embodiment of the invention, of a hoisting machine of an elevator. The brake according to the operating principle of FIG. 2 can be e.g. a drum brake, a shoe brake, a disc brake or a car brake of an elevator car, which engages in a prong-like manner with the guide rail to brake the movement of the elevator car. The brake comprises a frame part 1, which is attached to the frame of the hoisting machine. In addition, the brake comprises a braking piece 2 movably supported on the frame part 1, as well as a spring 5, which while supported on the frame part 1 pushes the brake pad attached to the braking piece 2 against the braking surface 16 of a rotating part of the hoisting machine. The braking piece 2 comprises a magnetic core, and the frame part 1 comprises an electromagnet 10, the electric current supplied to which brings about a force of attraction between the frame part 1 and the braking piece 2.

So that controlling the brake during normal operation of the elevator would be possible, the braking piece 2 must be pulled towards the frame part 1 by supplying current to the electromagnet 10 of the brake. Under the effect of the force of attraction of the electromagnet, the braking piece 2 is pressed against the screw 3. After this the brake is controlled during normal operation of the elevator with a motor 11, with a combination of a solenoid 11 and a lever arm, or other such actuator 11, which brings about a turning movement, with which the screw 3 is turned. The turning movement moves the screw 3, displacing the braking piece 2 by the aid of the screw 3 into the releasing position when the screw is moved away from the braking surface 16, and into the braking position when the screw is moved towards the braking surface 16, when the braking piece 2 is finally pressed against the braking surface 16. Consequently the braking piece can be moved with the control of the actuator 11 at a low speed, which reduces the noise produced by the operation of the brake.

In an operational anomaly of the elevator the brake is dropped by disconnecting the current supply of the electromagnet 10 with the switch 13, as is presented in FIG. 2. When the current supply is disconnected the effect of the electromagnet 10 resisting the spring force ceases, and the spring 5 pushes the braking piece 2 from the initial position of the drop-out movement limited by the screw 3 into the braking position against the braking surface 16. After this, opening of the brake with the actuator 11 is not possible before the drop-out situation is reset by again supplying current to the electromagnet 10.

The energy consumption of the brake can be reduced during a standstill of the elevator by de-energizing the brake by disconnecting the current supply of the electromagnet 10 after the brake has first been activated with the actuator 11. In this case the next time when opening the brake the drop-out situation must first be reset by supplying current to the electromagnet 10, after which the brake can be opened by controlling with the actuator 11.

Figure 3:
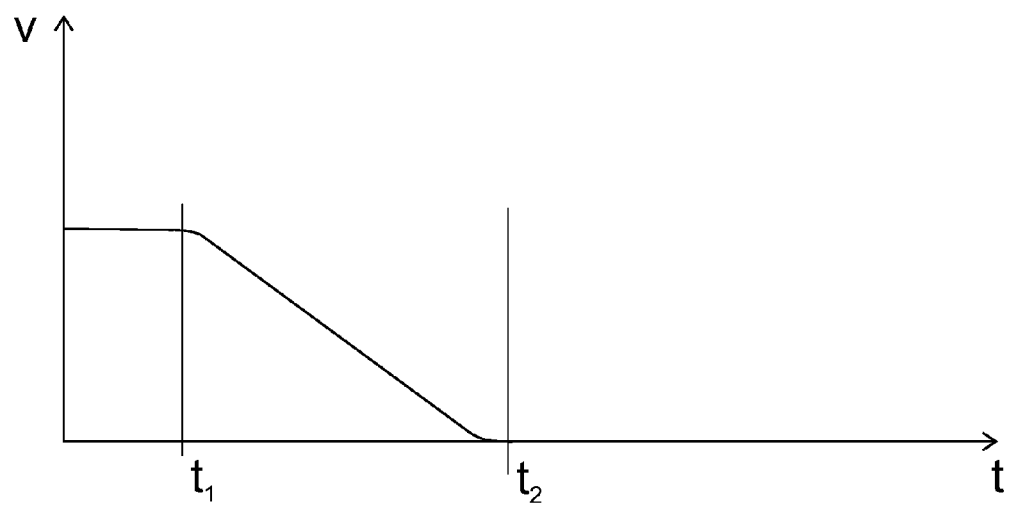
FIG. 3 illustrates a control method, according to an embodiment of the invention, of a brake of an elevator.

FIG. 3 presents one control method of a brake according to the embodiment of e.g. FIG. 1 or 2. At the time $t_1$ marked in FIG. 3 an electricity outage occurs, in which case the safety system of the elevator performs an emergency stop. The elevator control unit calculates for the elevator car from the starting moment of deceleration a speed reference, according to which the movement of the elevator car can be decelerated with a sufficiently low deceleration such that the elevator car finally stops at an oncoming stopping floor in the drive direction; the stopping time $t_2$ is also marked in FIG. 3. A sufficiently low deceleration preferably means a deceleration having a value not exceeding approx. 3 m/s$^2$; the deceleration can also, however, be slightly greater than this (approx. 6 m/s$^2$ or less) if the elevator car would otherwise be in danger of colliding with the end of the elevator hoistway or with an object in the elevator hoistway.

The elevator control unit compares the measured speed of the elevator car (e.g. the measured speed of the traction sheave of the hoisting machine) to the speed reference and on the basis of the comparison controls the actuator 11. The measured speed of the elevator car is adjusted towards the speed reference by controlling the brake with the actuator 11, such that the deceleration of the elevator car is increased by pressing the brake shoe/braking piece 2 in the initial position of the drop-out movement more strongly than before against the braking surface 16 with the actuator 11, in which case as the friction increases the speed of the elevator car decreases more quickly than before; correspondingly, the deceleration of the elevator car is reduced by lightening with the actuator 11 the force with which the brake shoe/braking piece 2 is pressed against the braking surface 16. In this way, by changing the deceleration of the elevator car, the speed of the elevator car is adjusted towards the speed reference such that the elevator car stops according to the speed reference at the stopping floor and the passengers are able to leave the elevator car.

If the measured speed of the elevator car differs from the speed reference by more than that permitted, the elevator control unit de-energizes the brake by opening the switch 13, in which case the effect of the counterforce element 9/electromagnet 10 resisting the spring force ceases, the brake shoe/braking piece 2 is pressed by the spring force against the braking surface 16 and the elevator car stops as quickly as possible.

In some embodiments a separate electronic supervision unit for the de-energizing of the brake is fitted into the elevator system, which electronic supervision unit monitors an emergency stop performed by the elevator control unit and following the speed reference, and de-energizes the brake by opening the switch 13 if the speed of the elevator car in such a case differs from the speed reference by more than that permitted.

The elevator control unit/electronic monitoring unit during an electricity outage receives its operating electricity e.g. from a battery.

It is obvious to the person skilled in the art that the different embodiments of the invention are not limited to the examples described above, but that they may be varied within the scope of the claims presented below.

It is obvious to the person skilled in the art that instead of a rotatable screw 3 for moving the braking piece, also a linearly moving support member 3 could be used.

It is obvious to the person skilled in the art that an initial position of the drop-out movement that can be modified in a controlled manner can also be achieved e.g. by adjusting the shape or length of the braking piece or of the base part such that in the initial position of the drop-out movement the distance of the braking piece from the braking position changes. The braking piece/base part can in this case be e.g. of two parts such that the parts are situated consecutively in the direction of the drop-out movement and the distance between them can be changed with a suitable adjustment means.

The invention claimed is:
1. A brake, comprising:
a base part;
a braking piece movably supported on the base part, which braking piece is configured to be moved between a braking position where the braking piece contacts a braking surface and a releasing position where the braking piece is spaced from the braking surface;
a spring, with the spring force applied to the braking piece and applied in a direction towards the braking surface;
a counterforce element which is activated to resist said spring force;
a movable support member for limiting an initial position of a drop-out movement of the braking piece, where said initial position is the position of the braking piece when the counterforce element is deactivated and the drop-out movement is the movement of the braking piece into the braking position upon the deactivation of the counterforce element; and a controllable actuator, which is mechanically connected to the support member and configured to displace the braking piece between the braking position and the releasing position, wherein the counterforce element is hinged, such that deactivation of the counterforce element causes a buckling of the counterforce element.

2. The brake according to claim 1, wherein the brake further comprises a triggering mechanism, which is connected to a force producing mechanism of the counterforce element, and is configured to deactivate the counterforce element to drop the braking piece from the initial position of the drop-out movement into the braking position.

3. The brake according to claim 2, wherein the force producing element is an electromagnet, and wherein the electromagnet activates the counterforce element by exerting an attraction force to the counterforce element.

4. The brake according to claim 3, wherein the triggering mechanism deactivates the counterforce element by disconnecting a current supplied to the electromagnet.

5. The brake according to claim 1, wherein the actuator is an electric motor, a frame of which is attached to the base part of the brake.

6. The brake according to claim 5, wherein a rotating shaft of the electric motor is connected to an eccentric adjustment mechanism, which is connected with a hinged joint to the support member such that the support member moves when the rotating shaft of the electric motor rotates.

7. The brake according to claim 6, wherein the eccentric adjustment mechanism allows the controllable actuator to displace the brake between the braking position and the releasing position.

8. An elevator system, comprising:
an elevator car; and
the brake according to claim 1 for braking the movement of the elevator car.

9. The elevator system according to claim 8, wherein the brake further comprises a triggering mechanism connected to a force producing mechanism of the counterforce element and is configured to deactivate the counterforce element in connection with an operational anomaly of the elevator.

10. The elevator system according to claim 8, wherein the brake of the elevator is configured to be controlled with the actuator during normal operation of the elevator.

11. A method for controlling the brake of the elevator system according to claim 8, comprising the steps of:
determining the operating mode of the elevator; and
controlling the brake during normal operation of the elevator by displacing the initial position of the drop-out movement of the braking piece with the actuator.

12. The method according to claim 11, further comprising the step of dropping the braking piece from the initial position of the drop-out movement into the braking position when an operational anomaly of the elevator is detected.

13. A method for controlling the brake according to claim 1 of an elevator in an operational anomaly of the elevator, comprising the step of adjusting the braking force with an actuator.

14. The method according to claim 13, further comprising the steps of:
forming a movement profile, according to which the movement of the elevator car can be stopped safely in connection with an emergency stop of the elevator; and
stopping the elevator car by changing the movement of the elevator car towards the movement profile by adjusting the braking force with the actuator.

15. The brake according to claim 1, wherein an electromagnet activates the counterforce element by exerting an attraction force to the counterforce element.

16. The brake according to claim 15, further comprising a triggering mechanism for disconnecting a current supplied to the electromagnet to deactivate the counterforce element.

17. The brake according to claim 1, wherein the braking piece is connected to a lever arm.

18. The brake according to claim 17, wherein the counterforce element is connected to a first end of the lever arm and the movable support member is connected to a second end of the lever arm, wherein the second end is opposite to the first end.

* * * * *